(12) United States Patent
Bowen et al.

(10) Patent No.: US 10,515,568 B2
(45) Date of Patent: *Dec. 24, 2019

(54) FLEXIBLE DRIVE SHAFT FOR GREETING CARDS AND THE LIKE

(71) Applicant: Hallmark Cards Incorporated, Kansas City, MO (US)

(72) Inventors: Douglas M. Bowen, Russellville, AR (US); Robert A. Covey, Independence, MO (US); Thomas A. Wallen, Merriam, KS (US); Robert R. Pavlu, Jr., Overland Park, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,123

(22) Filed: Sep. 26, 2018

(65) Prior Publication Data

US 2019/0035309 A1  Jan. 31, 2019

Related U.S. Application Data

(63) Continuation of application No. 15/823,223, filed on Nov. 27, 2017, now Pat. No. 10,089,904, which is a
(Continued)

(51) Int. Cl.
*G09F 19/02* (2006.01)
*G09F 1/06* (2006.01)
(Continued)

(52) U.S. Cl.
CPC .............. *G09F 1/06* (2013.01); *B42D 15/042* (2013.01); *F16C 1/12* (2013.01); *G09F 1/04* (2013.01); *G09F 19/02* (2013.01)

(58) Field of Classification Search
CPC .... G09F 15/0062; G09F 15/0025; G09F 1/06; B42D 15/042; B42D 15/045; D04D 7/10; A41G 1/04; B65D 5/4254; B65D 5/0254
See application file for complete search history.

(56) References Cited

U.S. PATENT DOCUMENTS

| 2,792,167 | A | 5/1957 | Sparks |
| 4,608,771 | A | 9/1986 | Mehta |

(Continued)

OTHER PUBLICATIONS

How do make flexible shaft for paper automata: YouTube.com; Published Jul. 3, 2012. Available at: https://www.youtube.com/watch?v=-Nw8SaMaZw.
(Continued)

*Primary Examiner* — Shin H Kim
(74) *Attorney, Agent, or Firm* — Shook Hardy & Bacon, L.L.P.

(57) ABSTRACT

A greeting card having mechanically actuated moving portions is provided. The greeting card may include a panel having one or more folds, one or more flexible drive shafts coupled to the panel and having a flipping or moving portion, and a decorative portion coupled to at least one of the panel and the flipping or moving portion. Each flexible drive shaft may be coupled to the panel such that a portion is positioned on a first side of the fold and a portion is positioned on a second side of the fold. When the greeting card is opened, a moment arm is created in the flexible drive shaft which causes the flipping or moving portion to move from a first position to a second position. The decorative portion may move in response to the flipping or moving portion moving from the first position to the second position.

20 Claims, 14 Drawing Sheets

Related U.S. Application Data continuation of application No. 15/398,524, filed on Jan. 4, 2017, now Pat. No. 9,830,836.

(51) Int. Cl.
*B42D 15/04* (2006.01)
*F16C 1/12* (2006.01)
*G09F 1/04* (2006.01)

(56) References Cited

U.S. PATENT DOCUMENTS

| | | |
|---|---|---|
| 4,774,780 A | 10/1988 | Crowell |
| 4,811,506 A | 3/1989 | Mehta |
| 5,017,057 A | 5/1991 | Kryger |
| 5,275,092 A | 1/1994 | Fauteux |
| 5,558,272 A | 9/1996 | Magister |
| D410,196 S | 5/1999 | Berg |
| 6,199,912 B1 | 3/2001 | Finkelshteyn |
| 6,869,369 B2 | 3/2005 | Fairweather |
| 7,409,787 B2 | 8/2008 | Glenn |
| 8,636,152 B1 | 1/2014 | Weigand |
| 8,695,242 B2 | 4/2014 | Nelson |
| 8,857,082 B2 | 10/2014 | Guo et al. |
| 8,858,232 B2 | 10/2014 | Caverly |
| 9,009,998 B2 | 4/2015 | Qiao et al. |
| 9,245,461 B1 | 1/2016 | Shlonsky |
| 9,248,688 B1 | 2/2016 | Mayer et al. |
| 9,272,482 B2 | 3/2016 | Sunoo et al. |
| 9,830,836 B1 * | 11/2017 | Bowen ................ B42D 15/042 |
| 10,089,904 B2 * | 10/2018 | Bowen ................ B42D 15/042 |
| 2006/0101679 A1 | 5/2006 | Glenn |

OTHER PUBLICATIONS

Notice of Allowance dated Nov. 8, 2018 in Canadian Patent Application No. 2,953,748, 1 page.

* cited by examiner

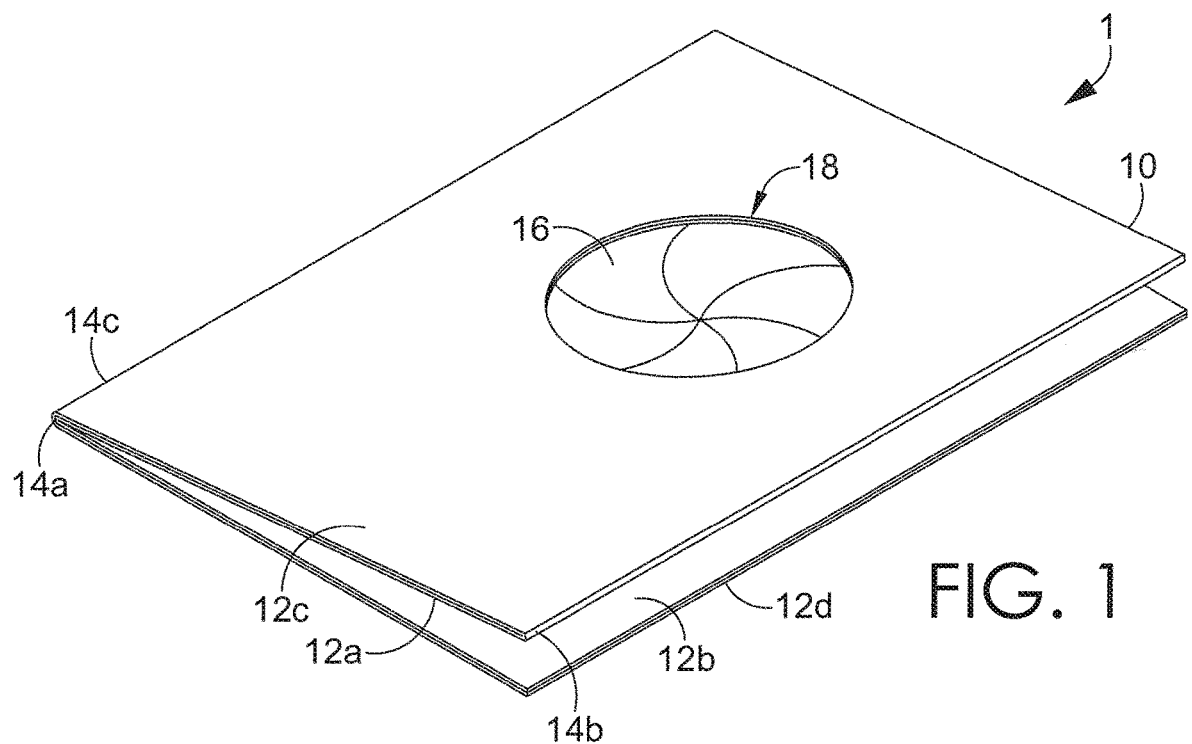
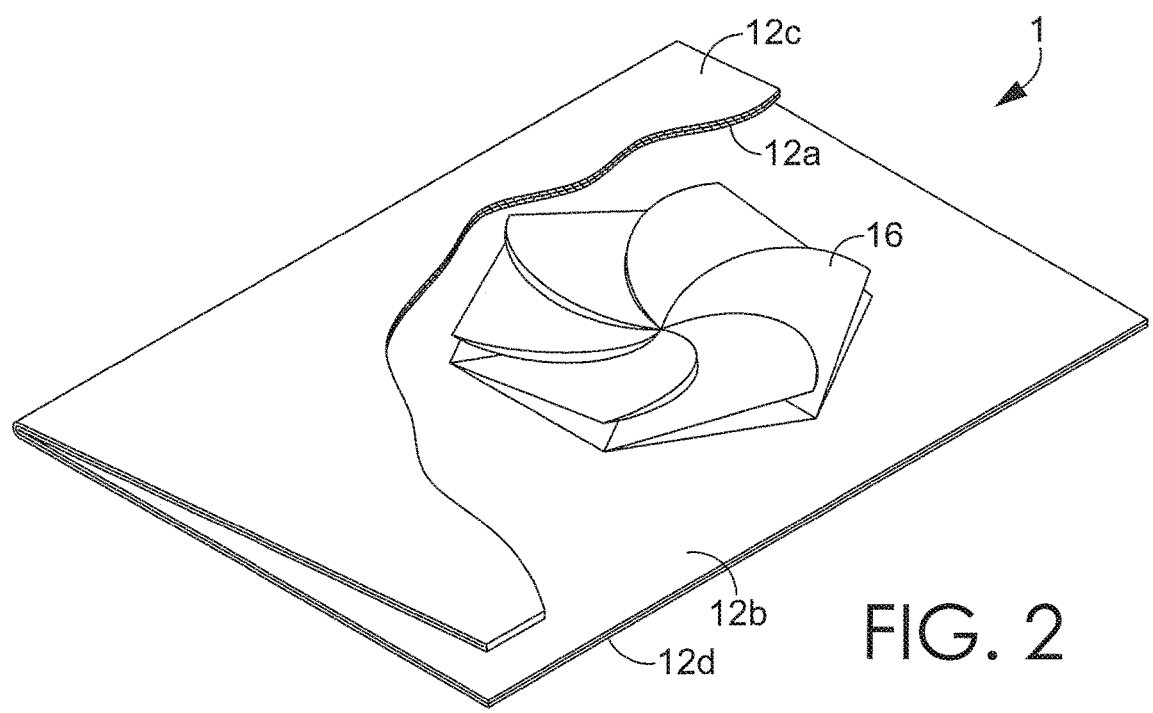

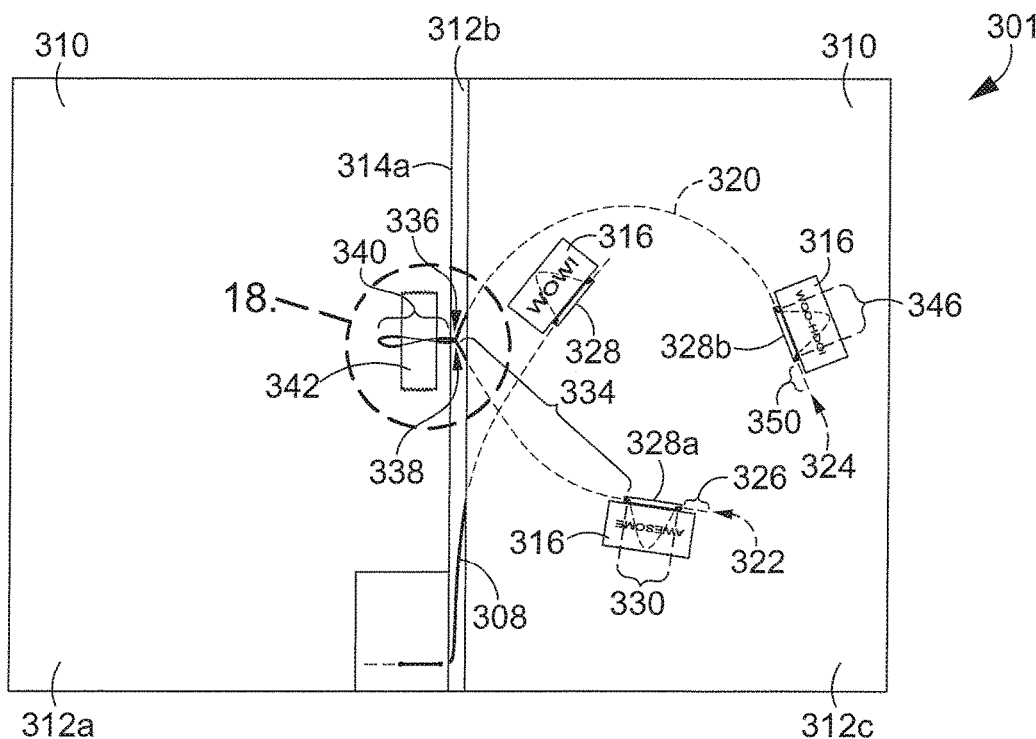
FIG. 16
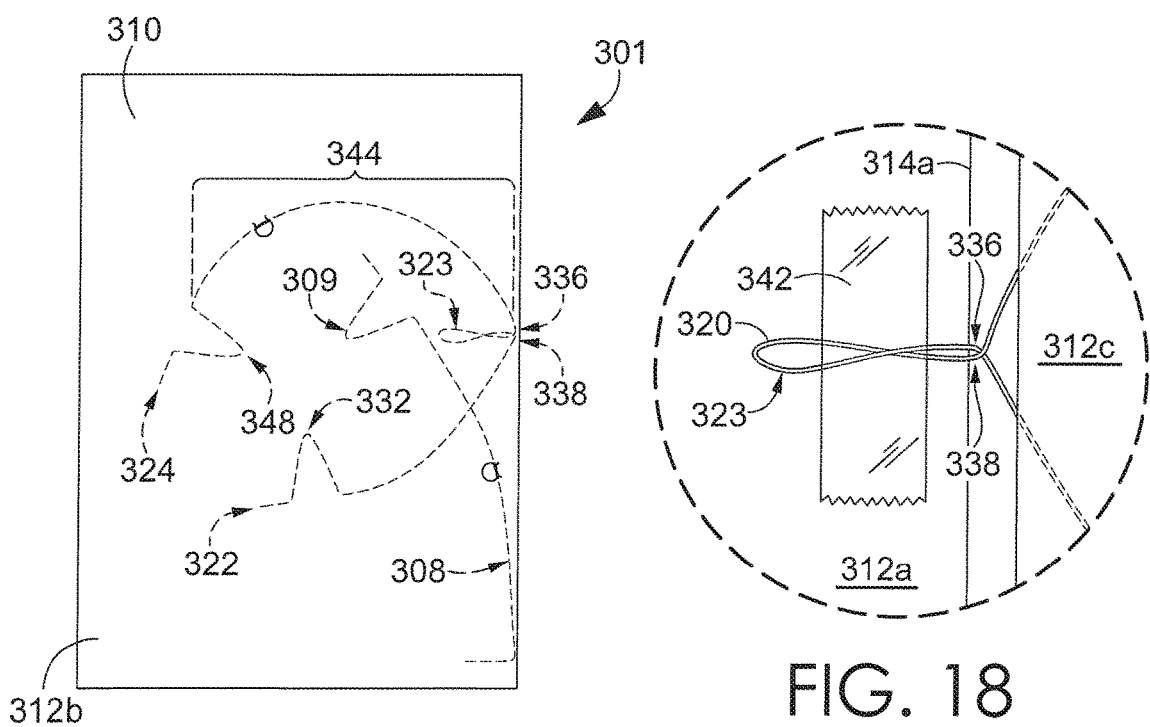
FIG. 17
FIG. 18

FLEXIBLE DRIVE SHAFT FOR GREETING CARDS AND THE LIKE

CROSS-REFERENCE TO RELATED APPLICATIONS

This application is a continuation of, and claims priority to, pending U.S. Nonprovisional application Ser. No. 15/823,223, filed Nov. 27, 2017, which is a continuation of U.S. Nonprovisional application Ser. No. 15/398,524, filed Jan. 4, 2017, which issued as U.S. Pat. No. 9,830,836 on Nov. 28, 2017, the disclosures of which are hereby incorporated by reference in their entirety for any and all purposes.

TECHNICAL FIELD

The present invention relates generally to movement mechanisms. More particularly, the present invention relates generally to movement mechanisms in products that contain two hinged planes that move toward and away from one another, for example greeting cards, books, invitations, boxes, and other objects with flaps.

BACKGROUND

Technology may be added to a greeting card or the like to make a compelling event occur (for example, mechanical movement of a decorative element) when a consumer interacts with the greeting card or similar object. It would be desirable that only a minimal amount of interaction be necessary to cause the compelling event. For example, it would be desirable for the compelling event to occur in response to the consumer opening and/or closing the greeting card or other object. Historically, movement has been provided in greeting cards via paper mechanics and electronically driven items. It would be desirable to have an alternate means of providing movement. It would also be desirable to create the compelling event anywhere within the greeting card, not just limited to a portion of the inside surface of the greeting card.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter. The scope of the invention is defined by the claims.

Embodiments of the present invention are directed to a flexible drive shaft for a greeting card or other object and may be used, for instance, to create an unexpected and compelling event when a consumer opens the greeting card. Aspects described herein provide for a greeting card that includes a decorative portion mechanically driven by a flexible drive shaft that in turn harnesses the work input by the consumer in opening the greeting card. Further, the flexibility of the flexible drive shaft permits the decorative portion to be positioned anywhere on a surface of the greeting card or even in an attachment or "pop-out" on a greeting card. The flexible driveshaft can also have portions positioned above the plane of the greeting card, using the wire of the flexible driveshaft to suspend an object above the plane of the greeting card, thereby simulating a rotating or flipping object floating in air.

In one aspect, a greeting card having mechanically actuated moving portions may comprise a panel having at least a first subpanel and a second subpanel. The first subpanel and the second subpanel may be separated by a fold in the panel. The second subpanel may have one or more openings formed therein. The greeting card may further comprise one or more flexible drive shafts, each having a first end, a second end, and a flipping portion between the first end and the second end. Each of the one or more flexible drive shafts may be coupled to the panel. Each of the first ends may be positioned on the first subpanel side of the fold and each second end may be positioned on the second subpanel side of the fold. The flipping portion of each of the flexible drive shafts may extend through the one or more openings in the second subpanel and may be configured to move between a first position and a second position when the greeting card is opened. A decorative portion may be affixed to at least one of the second subpanel and coupled with one or more of the flipping portions. The decorative portion may be configured to move in response to the flipping portion moving from the first position to the second position.

In another aspect, a flexible drive shaft for a greeting card having at least a first subpanel separated from a second subpanel by a fold may include a first end, a second end, a fixed bend in the flexible drive shaft between the first end and the second end, and a plurality of segments between the first end and the second end. The plurality of segments may include a first segment extending from the first end to the fixed bend and coupled to the first subpanel. The plurality of segments may further include a second segment extending from the fixed bend to a first opening in the second subpanel. The plurality of segments may also include a third segment extending from the first opening to the second end. The third segment may comprise a flipping portion configured to move from a first position when the greeting card is closed to a second position when the greeting card is open. The third segment may also comprise an end portion wherein the flipping portion extends from the first opening to a second opening in the second subpanel, and wherein the end portion extends from the second opening to the second end.

In yet another aspect, a greeting card may comprise a panel folded across a fold line to define a first subpanel and a second subpanel and may also include a flexible drive shaft having a first end, a second end, and a plurality of segments between the first end and the second end. The flexible drive shaft may be coupled to the panel. The plurality of segments may include a first segment extending from the first end to a first slot opening in the second subpanel. The plurality of segments may further include a second segment extending through the first slot opening to a first apex and from the first apex back through the first slot opening. A third segment may extend from the first slot opening to a first fixed bend in the flexible drive shaft. A fourth segment may extend from the first fixed bend to a second fixed bend, and the fourth segment may be positioned on the first subpanel side of the fold line. Alternatively, the fourth segment may extend from the first fixed bend to a position on the first subpanel side of the fold line. The plurality of segments may further comprise a reciprocal fifth segment, sixth segment, and seventh segment that are the mirror image of the third segment, the second segment, and the first segment, respectively. The fifth segment may extend from the second fixed bend to a second slot opening in the second subpanel. The sixth segment may extend through the second slot opening to a second apex and from the second apex back through the second slot opening. The seventh segment may extend from the second slot opening to the second end.

BRIEF DESCRIPTION OF THE SEVERAL VIEWS OF THE DRAWINGS

The present invention is explained in more detail below with reference to the embodiments illustrated in the attached drawing figures, in which like reference numerals denote like elements, in which FIGS. 1-18 illustrate but four possible embodiments of the present invention, and in which:

FIG. 1 is a front perspective view of a greeting card in a closed position, in accordance with an embodiment of the present invention;

FIG. 2 is the greeting card of FIG. 1, with a portion of a front panel partially cut away to illustrate a decorative portion normally concealed there beneath;

FIG. 3 is a front perspective view of the greeting card of FIG. 1, but with the greeting card in an open position;

FIG. 4 is an elevation view of the external surfaces of the greeting card of FIG. 1 in an unassembled position;

FIG. 5 is an elevation view of the internal surfaces of the greeting card of FIG. 1 in an unassembled position;

FIG. 6 is the greeting card of FIG. 5, but with the middle two panels folded together;

FIG. 7 is a perspective view of the greeting card of FIG. 6;

FIG. 8 is a front elevation view of a greeting card in a closed position, in accordance with a second embodiment of the present invention;

FIG. 9 is an elevation view of an interior spread of the greeting card of FIG. 8 in an open position;

FIG. 10 is an elevation view of the internal surfaces of the greeting card of FIG. 8 in an unassembled position;

FIG. 11 is the greeting card of FIG. 10, but with the middle two panels folded together;

FIG. 12 is a front perspective view of greeting card in a closed position, with a portion of a front portion partially cut away for clarity, in accordance with a third embodiment of the present invention;

FIG. 13 is an elevation view of an interior spread of the greeting card of FIG. 12 in an open position;

FIG. 14 is a rear elevation view of the greeting card of FIG. 12 in a closed position;

FIG. 15 is a front perspective view of a greeting card in a closed position, with a portion of a front portion partially cut away for clarity, in accordance with a fourth embodiment of the present invention;

FIG. 16 is an elevation view of the greeting card of FIG. 15 in an open position;

FIG. 17 is a rear elevation view of an interior spread of the greeting card of FIG. 15 in a closed position;

FIG. 18 is an enlarged fragmentary view of the greeting card of FIG. 16 in the area 18.

DETAILED DESCRIPTION

Figure 3:
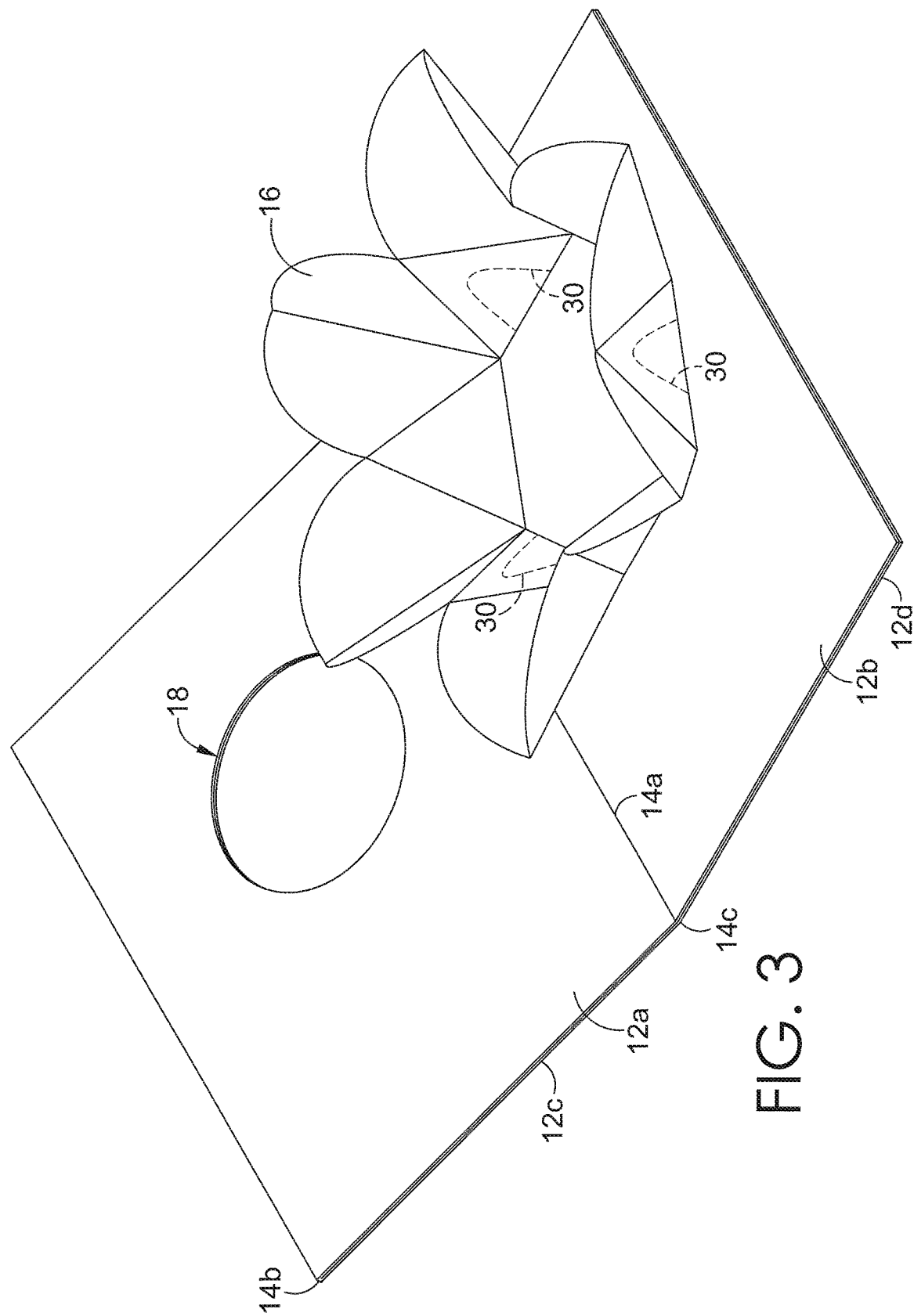

The subject matter of the present invention is described with specificity herein to meet statutory requirements. However, the description itself is not intended to limit the scope of this patent. Rather, the inventors have contemplated that the claimed subject matter might also be embodied in other ways, to include different steps or a combination of steps similar to the ones described in this document, in conjunction with other present or future technologies.

Embodiments of the present invention are directed to a flexible drive shaft for a greeting card and may be used, for instance, to create an unexpected and compelling event when a consumer opens the greeting card. Aspects herein provide for a greeting card that includes a decorative portion mechanically driven by a flexible drive shaft that in turn harnesses the work input of a consumer in opening the greeting card. Further, the flexibility of the flexible drive shaft permits the decorative portion to be positioned anywhere on a surface of the greeting card.

In one aspect, a greeting card having mechanically actuated moving portions may include a panel having at least a first subpanel and a second subpanel. The first subpanel and the second subpanel may be separated by a fold in the panel. The second subpanel may have one or more openings formed therein. The greeting card may further include one or more flexible drive shafts, each having a first end, a second end, and a flipping portion between the first and second ends. Each of the one or more flexible drive shafts may be coupled to the panel. Each of the first ends may be positioned on the first subpanel side of the fold and each second ends may be positioned on the second subpanel side of the fold. The flipping portions of each of the flexible drive shafts may extend through the one or more openings in the second subpanel and may be configured to move from a first position to a second position when the greeting card is opened. A decorative portion may be affixed to at least one of the second subpanel and one or more of the flipping portions. The decorative portion may be configured to move in response to the flipping portion moving from the first position to the second position.

In another aspect, a flexible drive shaft for a greeting card having at least a first subpanel separated from a second subpanel by a fold may include a first end, a second end, a fixed bend in the flexible drive shaft between the first end and the second end, and a plurality of segments between the first end and the second end. The plurality of segments may include a first segment extending from the first end to the fixed bend and coupled to the first subpanel. The plurality of segments may further include a second segment extending from the fixed bend to a first opening in the second subpanel. The plurality of segments may also include a third segment extending from the first opening to the second end. The third segment may comprise a flipping portion configured to move from a first position when the greeting card is closed to a second position when the greeting card is open. The third segment may also comprise an end portion, wherein the flipping portion extends from the first opening to a second opening in the second subpanel, and wherein the end portion extends from the second opening to the second end.

In yet another aspect, a greeting card may comprise a panel folded across a fold line to define a first subpanel and a second subpanel and may also include a flexible drive shaft having a first end, a second end, and a plurality of segments between the first end and the second end. The flexible drive shaft may be coupled to the panel. The plurality of segments may include a first segment extending from the first end to a first slot opening in the second subpanel. The plurality of segments may further include a second segment extending through the first slot opening to a first apex and from the first apex back through the first slot opening. A third segment may extend from the first slot opening to a first fixed bend in the flexible drive shaft. A fourth segment may extend from the first fixed bend to a second fixed bend, and the fourth segment may be positioned on the first subpanel side of the fold line. Alternatively, the fourth segment may extend from the first fixed bend to a position on the first subpanel side of the fold line. The plurality of segments may further comprise a reciprocal fifth segment, sixth segment, and seventh segment that are the mirror image of the third segment, the second segment, and the first segment, respectively. The fifth segment may extend from the second fixed bend to a second slot opening in the second subpanel. The sixth segment may extend through the second slot opening to a second apex and from the second apex back through the second slot opening. The seventh segment may extend from the second slot opening to the second end.

Referring now to the drawings in more detail, wherein like reference characters designate like parts throughout the different views, and initially to FIGS. 1-7, a greeting card 1 having one or more flexible drive shafts 20 is depicted, in accordance with a first embodiment of the present invention. The greeting card 1 includes a panel 10, one or more flexible drive shafts 20 coupled to the panel 10 and each having a flipping portion 30, and a decorative portion 16. In some embodiments, the greeting card 1 may further include a cover (not shown).

Figure 4:
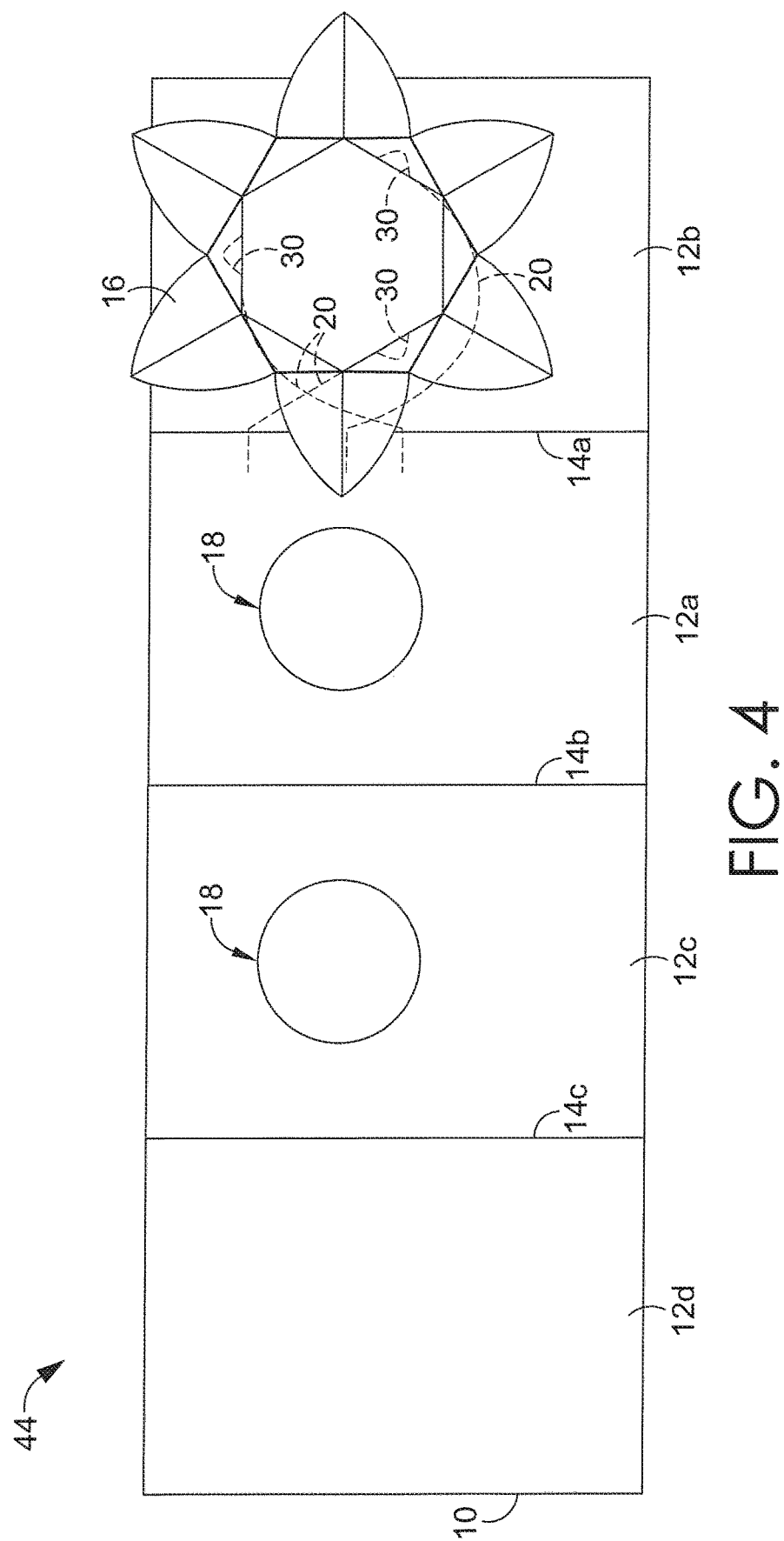

The panel 10 may include two or more subpanels and at least one fold. For example, the panel 10 may include a first subpanel 12a and a second subpanel 12b separated from one another by a first fold 14a. Some embodiments of the panel 10 may include additional subpanels to hide non-aesthetic portions of the greeting card 1 from view, such as the illustrated embodiment. The illustrated panel 10 includes the first subpanel 12a, the second subpanel 12b, a third subpanel 12c, and a fourth subpanel 12d. As seen in FIG. 4, the third subpanel 12c may be positioned adjacent the first subpanel 12a across a second fold 14b and opposite the second subpanel 12b. Similarly, the fourth subpanel 12d may be positioned adjacent the third subpanel 12c across a third fold line 14c. In the illustrated embodiment, the first subpanel 12a and the third subpanel 12c are positioned between the fourth subpanel 12d and the second subpanel 12b.

Each of the greeting card 1 and the panel 10 may have a folded position and an unfolded position. In some aspects, the folded position of the greeting card 1 (shown in FIG. 1) may correspond to the folded position of the panel 10 (shown in FIG. 1). In other aspects, the unfolded position of the greeting card 1 (shown in FIG. 3) may correspond to a second folded position of the panel 10 (shown in FIG. 3). In further aspects, the unfolded position of the greeting card 1 (shown in FIG. 3) may not correspond to the unfolded position of the panel 10 (shown in FIG. 4). In aspects wherein the panel 10 includes only two subpanels (not shown), the folded positions and unfolded positions of the greeting card 1 and the panel 10 may be the same.

The folded position of the greeting card 1 may have an interior portion and an exterior portion. The interior portion of the greeting card 1 may be obscured from view when the greeting card 1 is in the folded position (i.e., closed) and may be exposed when the greeting card 1 is in the unfolded position (i.e., open).

Figure 5:
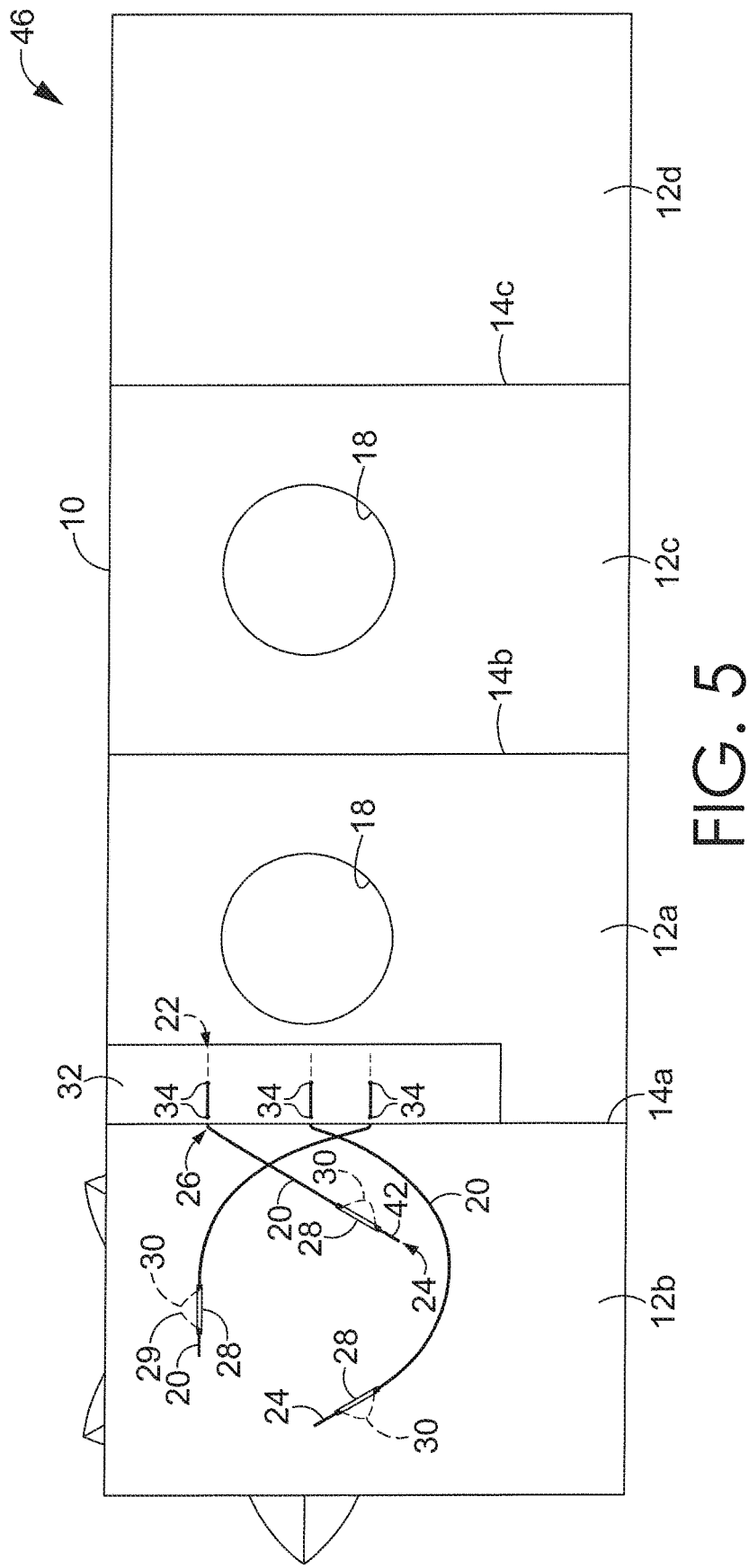

The panel 10 has an external surface 44 (shown in FIG. 4) and an internal surface 46 (shown in FIG. 5). In some embodiments, the external surface 44 may be viewed when the greeting card 1 is in either the folded position or unfolded position, and the internal surface 46 may be viewed only when the panel 10 is in the unfolded position. In other embodiments, such as where the panel 10 has only two subpanels, the external surface 44 may comprise the interior portion of the greeting card 1 and the internal surface 46 may comprise the external portion of the greeting card 1. In still further embodiments where the panel 10 has only two subpanels, the cover may be affixed to the internal surface 46 to obscure the internal surface 46 and any internal components of the greeting card 1 (such as the one or more flexible drive shafts 20) from view.

Returning to FIG. 1, the panel 10 may include one or more windows 18 for viewing the interior portion of the greeting card 1 when the greeting card 1 is in the folded position. For example, the first subpanel 12a and the third subpanel 12c may each include a window 18 through which an interior portion of the greeting card 1 (such as part of the decorative portion 16) may be viewed.

The decorative portion 16 may be affixed to the panel 10. For example, the decorative portion 16 may be affixed to the second subpanel 12b. In other embodiments, the decorative portion 16 may be positioned proximate to the second subpanel 12b. For example, and as further described below, the decorative portion 16 may be affixed to the one or more flexible drive shafts 20 at the flipping portion 30.

Referring to FIG. 5, the greeting card 1 may include one or more flexible drive shafts 20. For example, the illustrated aspect includes three flexible drive shafts 80. The flexible drive shafts 20 may comprise any material that is flexible, that can rotate, that can transfer torque, and that can fit within a greeting card. For example, spring wire may be used to form the flexible drive shafts 20. Each of the flexible drive shafts 20 may include a first end 22 opposite a second end 24, a flipping portion 30 between the first end 22 and the second end 24, and at least one fixed bend 26.

The at least one fixed bend 26 may be positioned proximate to the first fold 14a. From the at least one fixed bend 26, each of the flexible drive shafts 20 may extend towards the first end 22 adjacent the first subpanel 12a. Similarly, from the at least one fixed bend 26, each of the flexible drive shafts 20 may extend towards the second end 24 adjacent the second subpanel 12b. Hence, when the greeting card 1 is in the folded position each of the one or more flexible drive shafts 20 may wrap around the first fold 14a. When the greeting card 1 moves from its folded position to its unfolded position (i.e., when it is opened), a moment arm is created about the at least one fixed bend 26.

Each of the one or more flexible drive shafts 20 may include a plurality of segments. For example, in the illustrated embodiment of FIG. 6, each of the one or more flexible drive shafts 20 may include a first segment 36 that extends from the first end 22 to the at least one fixed bend 26. The plurality of segments may also include a second segment 38 that extends from the at least fixed bend 26 to an opening 28 formed through the second subpanel 12b. The opening 28 may comprise a slot, such as in the illustrated embodiment. The opening 28 may also comprise a pair of apertures. The plurality of segments may also include a third segment 40 that extends from the opening 28 to the second end 24.

In some aspects, the third segment 40 may include the flipping portion 30. In further aspects, the third segment 40 may include the flipping portion 30, which extends and returns through the opening 28, and an end portion 42 that extends from the opening 28 to the second end 24. For example, in the illustrated embodiment of FIG. 5, each flipping portion 30 may extend through the opening 28 to an apex 29 and return back through the opening 28, and the end portion 42 may extend from the opening 28 to the second end 24. In some aspects, each of the one or more flexible drive shafts 20 may extend along the internal surface 46 of the panel 10 except for the flipping portion 30 that may extend along the external surface 44 of the panel 10. In other aspects, each of the one or more flexible drive shafts 20 may extend along the internal surface 46 of the panel 10 except for the third segment 40 that may extend along the external surface 44 of the panel 10. In this manner, all but the flipping portion 30 or the third segment 40 may be obscured from view when the panel 10 is in the folded position (shown in FIG. 1) or the second folded position (shown in FIG. 3).

The flipping portion 30 may comprise a flexed segment of each of the one or more drive shafts 20 that extends through the opening 28. In some aspects, the flipping portion 30 may comprise a bent segment of each of the one or more drive shafts 20 that extends through the opening 28. In one aspect, the bent segment of the flipping portion 30 may comprise a first bend that turns the flexible drive shaft 20 through the opening 28. The bent segment may extend from the first bend to the apex 29 before returning to the opening 28 to a second bend. The second bend may turn the flexible drive shaft 20 back through the opening 28. Each of the first bend and the second bend may help couple the flexible drive shaft 20 to the panel 10. For example, the flipping portion 30 may be flexed by the opening 28 such that the flipping portion 30 presses against the edges of the opening 28.

The decorative portion 16 may be coupled to the panel 10, at least one flipping portion 30, or both the panel 10 and the at least one flipping portion 30. The flipping portion 30 may communicate its mechanical energy to the decorative portion 16 causing the decorative portion 16 to move as the greeting card 1 is unfolded.

The one or more flexible drive shafts 20 may be coupled to the panel 10 at the first subpanel 12a and the second subpanel 12b. For example, the one or more flexible drive shafts 20 may be secured to the first subpanel 12a by a retaining panel 32. The retaining panel 32 may include one or more retaining panel openings 34. Each of the one or more flexible drive shafts 20 may be threaded through the one or more retaining panel openings 34 to permit the one or more flexible drive shafts 20 to freely rotate while secured to the first subpanel 12a.

Figure 6:
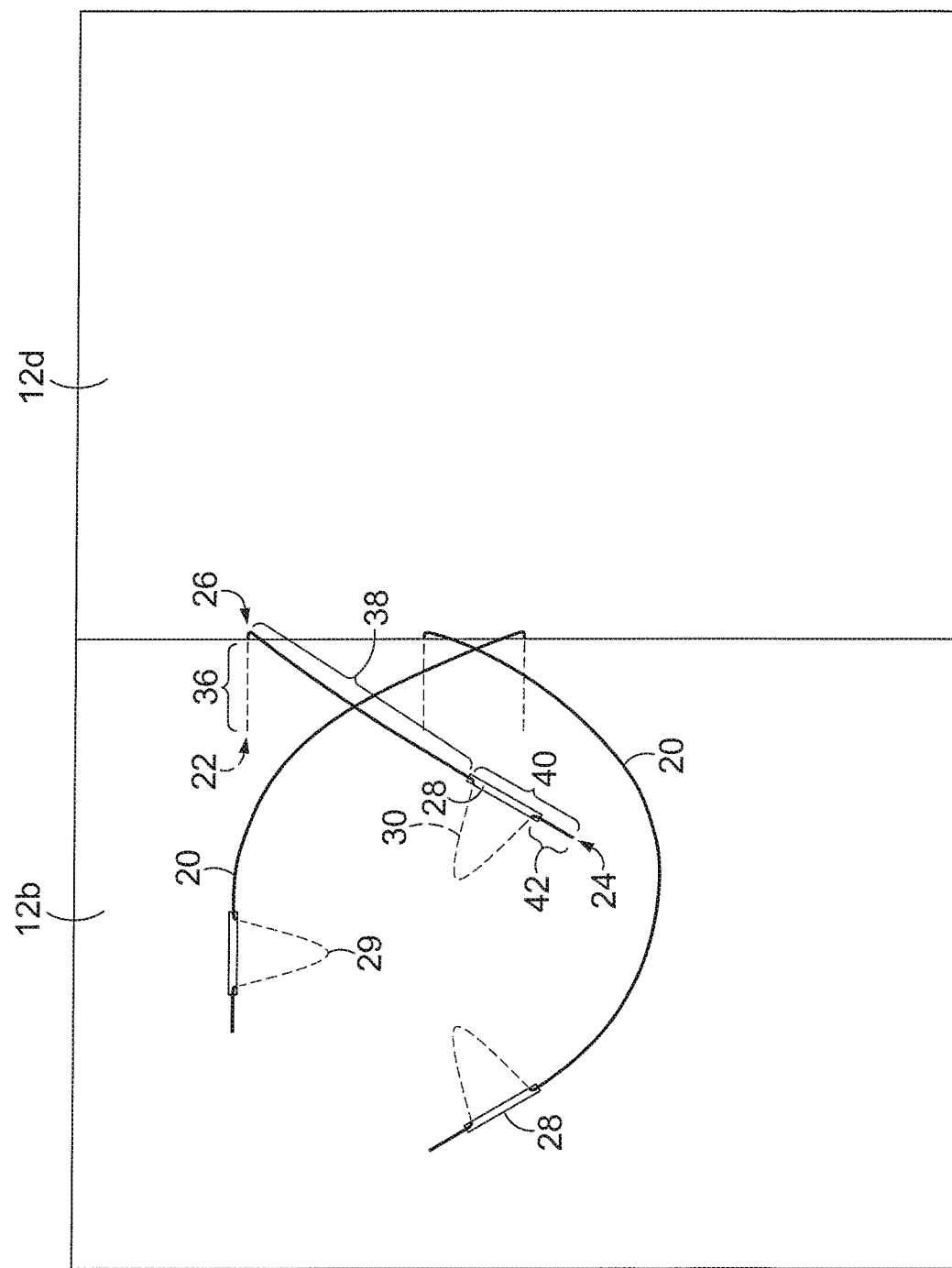

When the greeting card 1 is moved from its folded position (as shown in FIG. 1) to its unfolded position (as shown in FIG. 3), a moment arm is created in each of the one or more flexible drive shafts 20 between the first end 22 and the one or more fixed bends 26. The second segment 38 and the third segment 40 remain in position while the greeting card 1 is opened until the moment arm generates enough force to overcome the frictional forces holding the second segment 38 and the third segment 40 in position. When the moment arm increases to the point that it will overcome these frictional forces, the one or more flexible drive shafts 20 attempt to rotate and/or straighten out, which results in the flipping portion 30 moving from a first position (as illustrated in FIG. 6) to a second position (as illustrated in FIG. 5).

Referring to FIGS. 2-3, moving the flipping portion 30 from the first position to the second position causes the decorative portion 16 to move. For example, as the greeting card 1 is opened and the flipping portion 30 moves between the first position (shown in FIG. 2) and the second position (shown in FIG. 3), the decorative portion 16 moves in response to cause a compelling event to occur.

Figure 7:
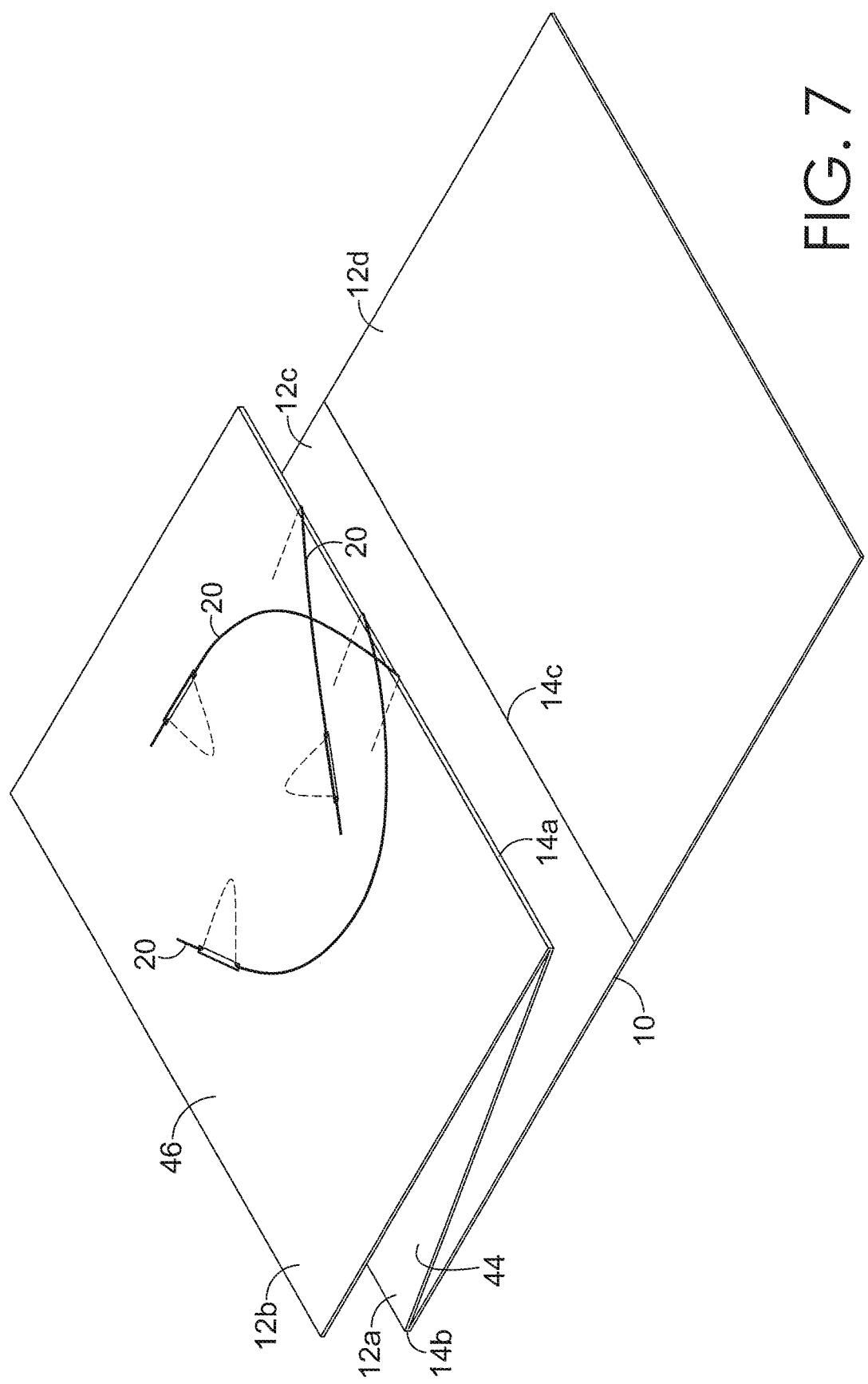
Figure 8:
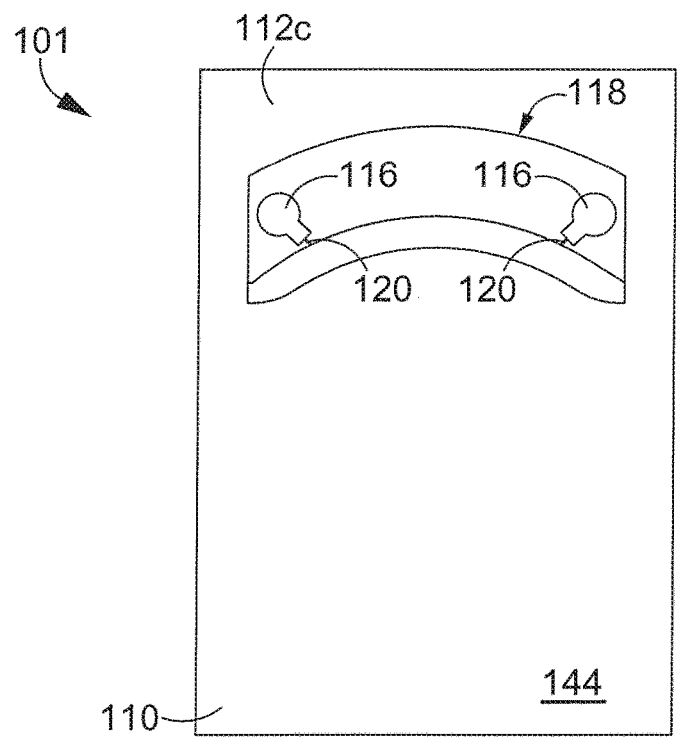
Figure 9:
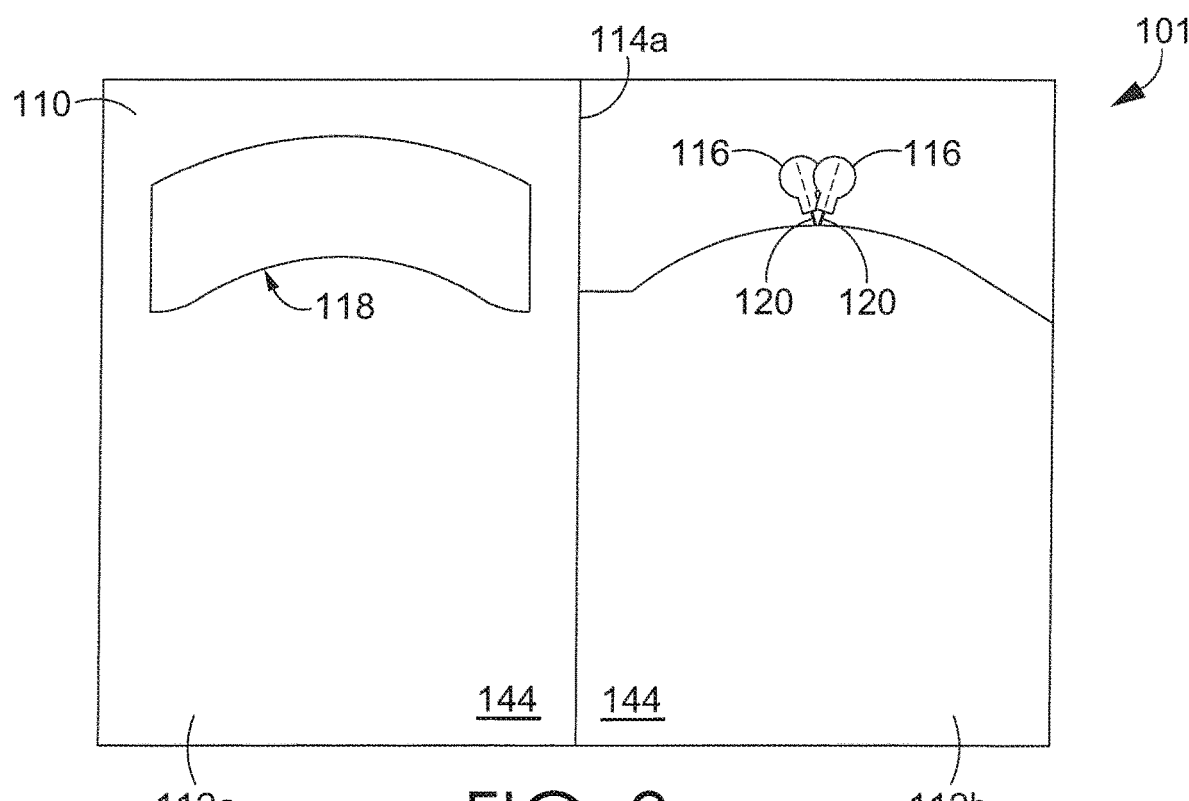

Referring now to FIG. 7, the panel 10 may be folded at the first fold 14a, the second fold 14b, and the third fold 14c. In some aspects, the one or more flexible drive shafts 20 may be positioned substantially along the internal surface 46 of the panel 10. Folding the greeting card 1 along each of these folds may result in the external surface 44 of the panel 10 being observable by a consumer while obscuring the internal surface 46 and the one or more flexible drive shafts 20 from view.

Referring now to FIGS. 8-11, another embodiment of a greeting card 101 having one or more flexible drive shafts 120 in accordance with the present invention is depicted. The greeting card 101 includes a panel 110, the one or more flexible drive shafts 120 coupled to the panel 110 and each having a flipping portion 130 (FIG. 11) and a decorative portion 116. The greeting card 101 has a folded position (shown in FIG. 8) and an unfolded position (shown in FIG. 9). The panel 110 has multiple folded positions (such as those shown in FIGS. 8, 9, and 11) and an unfolded position (shown in FIG. 10).

Figure 10:
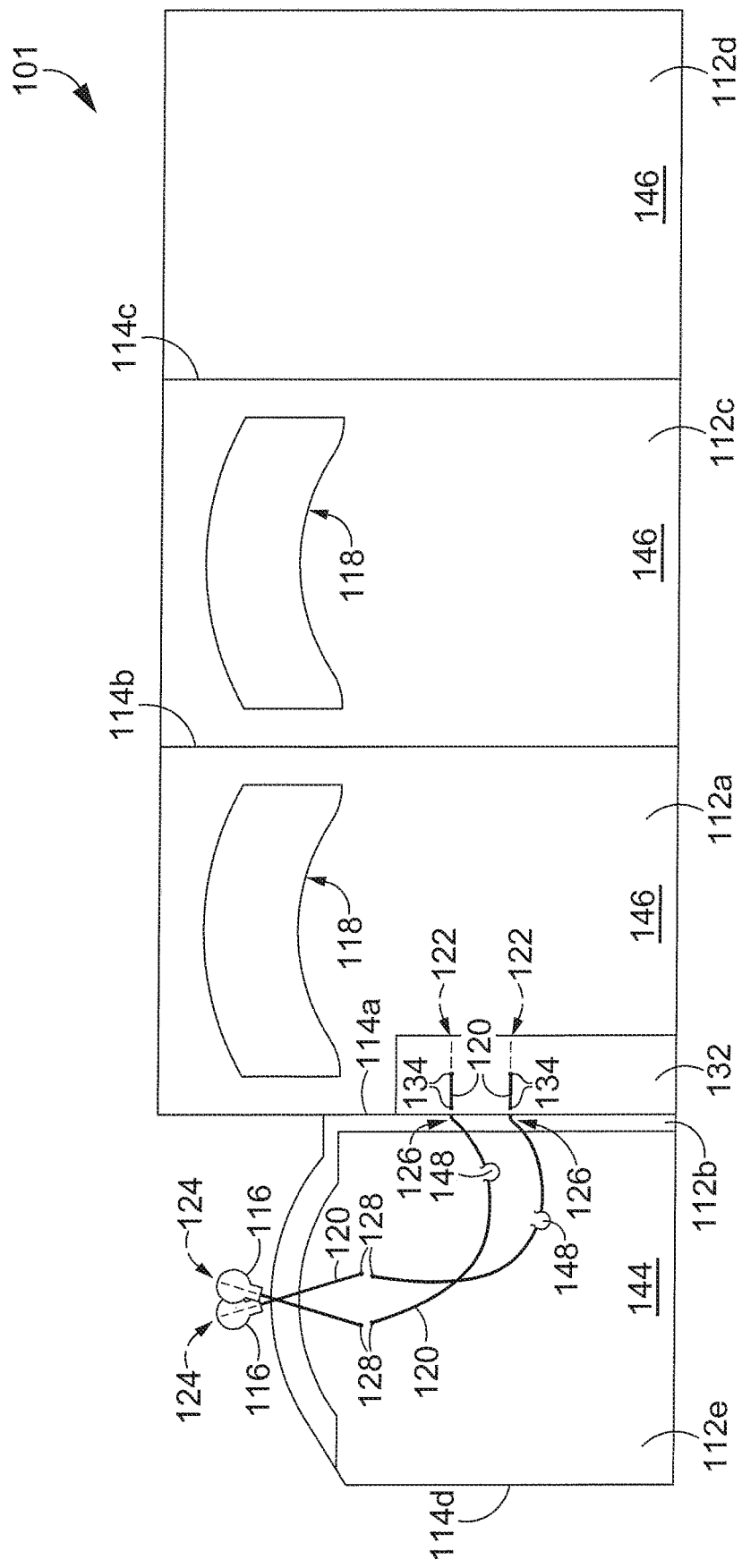

The greeting card 101 may include many of the same features as the greeting card 1 (discussed above in reference to FIGS. 1-7). For example, the greeting card 101 may include a panel 110 having multiple subpanels each separated by a fold. Referring to FIG. 10, the panel 110 includes a first subpanel 112a, a second subpanel 112b, a third subpanel 112c, a fourth subpanel 112d, and a fifth subpanel 112e. Each of the subpanels are separated by a fold. For example, the first subpanel 112a is separated from the second subpanel 112b by a first fold 114a. The illustrated panel 110 includes four folds, including the first fold 114a, a second fold 114b between the first subpanel 112a and the third subpanel 112c, a third fold 114c between the third subpanel 112c and the fourth subpanel 112d, and a fourth fold 114d between the second subpanel 112b and the fifth subpanel 112e. In some aspects, the subpanels may not be integral to the panel 110, but are each affixed to one another to form the panel 110 in a manner permitting each to fold over an adjacent subpanel.

Figure 11:
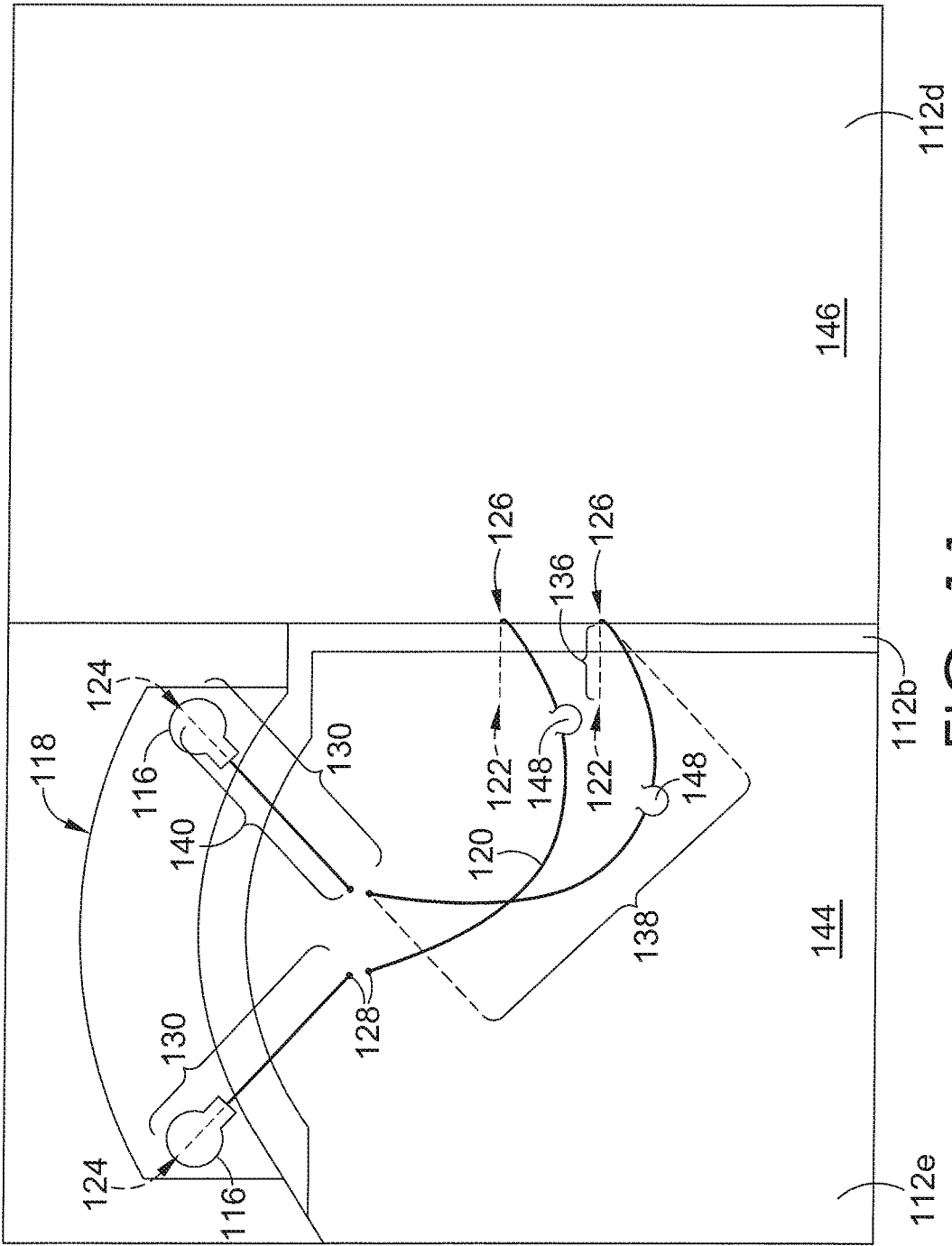

As best seen in FIG. 11, the one or more flexible drive shafts 120 include a first end 122 opposite a second end 124 and include a plurality of segments there-between. The plurality of segments may include a first segment 136 extending from the first end 122 to a fixed bend 126, a second segment 138 extending from the fixed bend 126 to a pair of openings 128, and a third segment 140 extending from the pair of openings 128 to the second end 124. The third segment 140 may comprise the flipping portion 130.

Referring to FIG. 10, the one or more flexible drive shafts 120 are coupled to the panel 110 such that the fixed bend 126 is proximate the first fold 114a. In the illustrated embodiment, the first segment 136 is coupled to the first subpanel 112a such that the first end 122 is positioned on the first subpanel side of the first fold 114a. In one possible arrangement, one or more of the second segment 138 and the third segment 140 are coupled to the second subpanel 112b such that the second end 124 is positioned on the second subpanel side of the first fold 114a. In yet another possible arrangement, one or more of the second segment 138 and the third segment 140 may be coupled to the fifth subpanel 112e such that the second end 124 is positioned on the second subpanel side of the first fold 114a.

In the illustrated embodiment the first segment 136 is coupled to the first subpanel 112a by a retaining panel 132. In some aspects the retaining panel 132 may include retaining panel openings 134. The first segment 136 is threaded through the retaining panel openings 134 such that the first segment 136 is held against the first subpanel 112a but may twist within the retaining panel openings 134. The second segment 138 may be coupled to the fifth subpanel 112e at one or more tabs 148. The one or more tabs 148 may be formed by making incisions in the fifth subpanel 112e. A portion of the second segment 138 is received within the one or more tabs 148 and becomes coupled to the fifth subpanel 112e by sliding the second segment 138 under the tab 148. The portion of the second segment 138 received by the tab 148 may be seen on the opposite side of the subpanel. The third segment 140 is then coupled to the fifth subpanel 112e at the pair of openings 128. The third segment 140 may be received in the pair of openings 128 by threading the third segment 140 therethrough. A portion of the third segment 140 received by the pair of openings 128 may be seen on the opposite side of the subpanel.

In order to obscure the portion of the second segment 138 and/or the portion of the third segment 140 that may be seen on the opposite side of the subpanel, the second subpanel 112b is provided. In the illustrated embodiment, the fifth subpanel 112e is adjacent to the second subpanel 112b and is separated by the fourth fold 114d and, in FIG. 10, the second subpanel 112b is behind the fifth subpanel 112e. In some aspects, rather than the second segment 138 and/or the third segment 140 being coupled to the fifth subpanel 112e, such segments may be coupled to the second subpanel 112b. In some embodiments, including the illustrated embodiment, the second subpanel 112b and the fifth subpanel 112e may be smaller than the other subpanels (such as the first subpanel 112a). For example, each of the subpanels may have the same or similar width but the second subpanel 112b and the fifth subpanel 112e may be shorter than the other subpanels. The illustrated second subpanel 112b and fifth subpanel 112e have a shorter height that allows a portion of the third segment 140 to extend above a top edge of both of the second subpanel 112b and fifth subpanel 112e but remain below a height of the first subpanel 112a.

The panel 110 includes one or more windows 118 through which an interior portion of the greeting card 101 in the folded position (i.e., closed) may be viewed. For example, a portion of the third segment 140 may be viewed in the first position when the greeting card 101 is folded.

When the greeting card 101 moves from its folded position (shown in FIG. 8) to its unfolded position (shown in FIG. 9), such as when it is opened, the first segment 136 creates a moment arm about the fixed bend 126. As described above, once the moment arm reaches a threshold to overcome the frictional resistance holding the flipping portion 130 in the first position (shown in FIG. 8), the flipping portion 130 moves to the second position (shown in FIG. 9). In the illustrated embodiment, one of the decorative portions 116 is coupled to the flipping portion 130 at the second end 124 of each of the one or more flexible drive shafts 120. Hence, when the flipping portion 130 moves from the first position to the second position, each decorative portion 116 coupled to each flipping portion 130 is mechanically moved. It should be noted that the flipping portion 130 can not only "flip", but can also "slide." This is accomplished by the flexible drive shafts 120 not only being flexed (like in the first embodiment), but by having the fixed bends 126.

Figure 12:
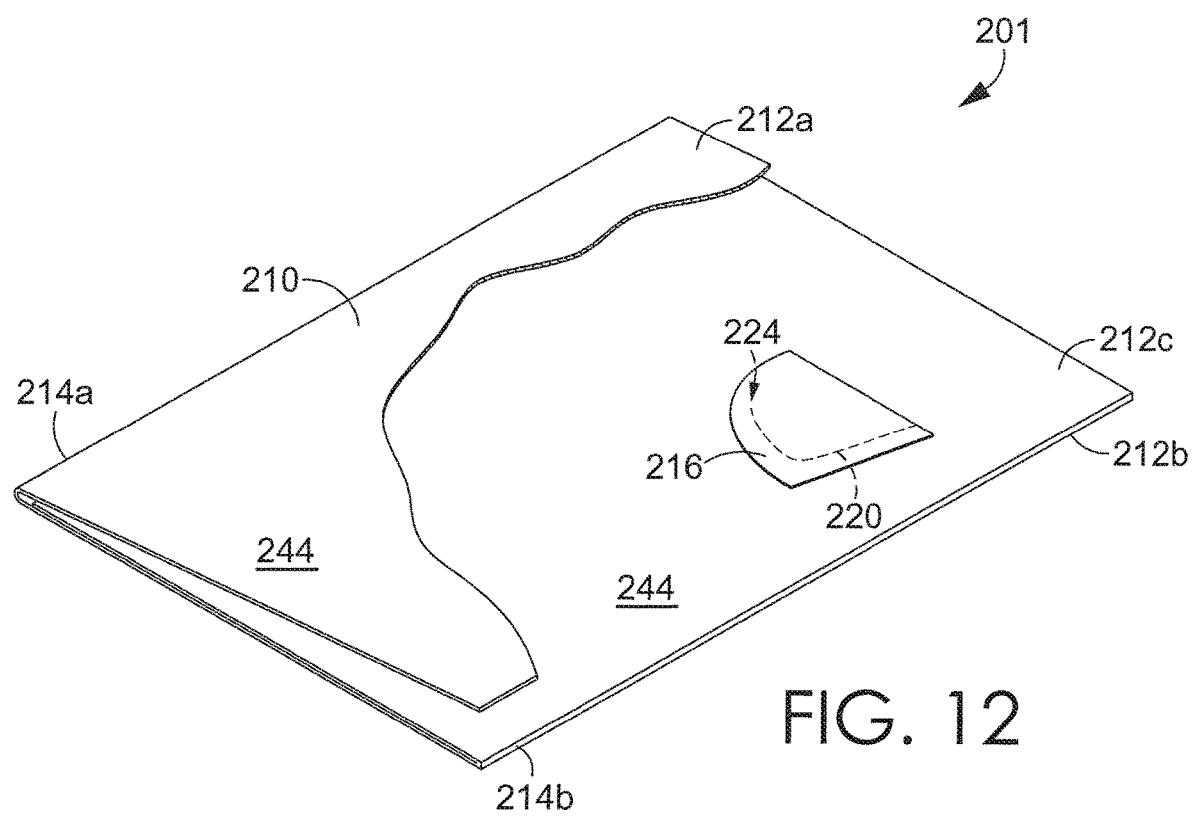
Figure 13:
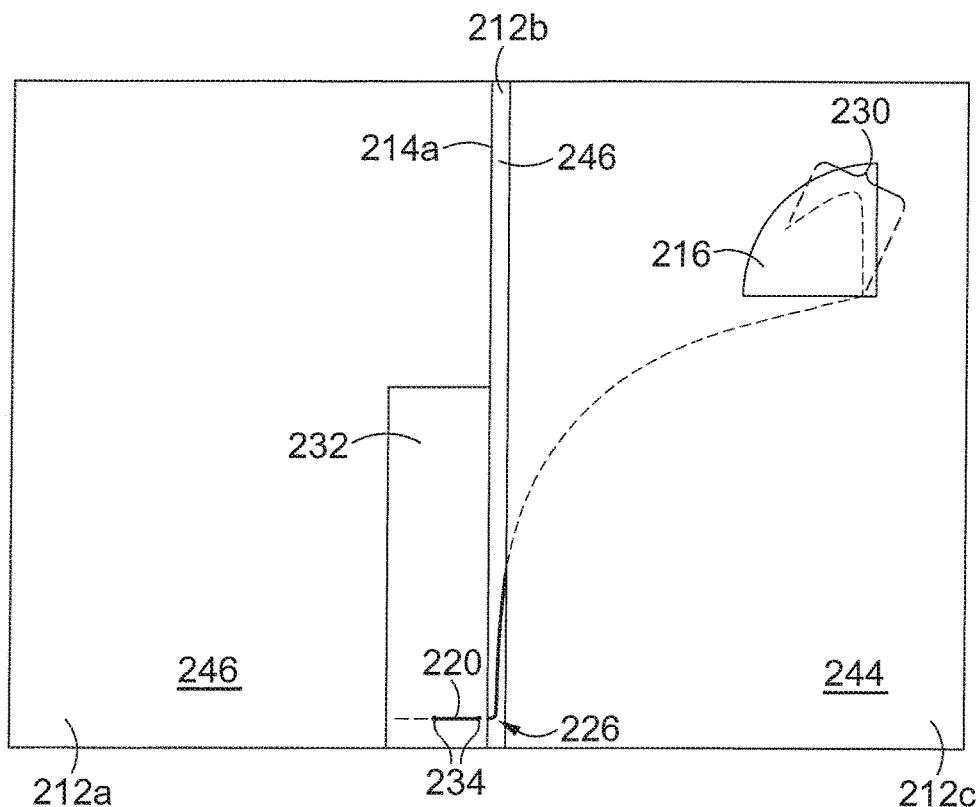
Figure 14:
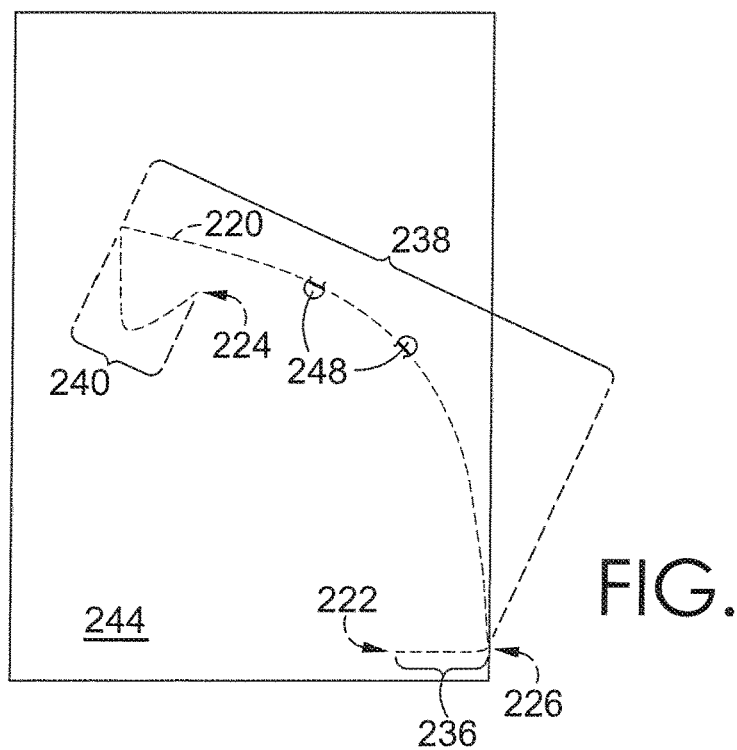

Referring now to FIGS. 12-14, another embodiment of a greeting card 201 making use of a flexible drive shaft of the present invention is illustrated. The greeting card 201 includes a panel 210, a flexible drive shaft 220 having a flipping portion 230 coupled to a decorative portion 216. This embodiment is similar to the above embodiments in that it includes a panel 210 having multiple subpanels separated by folds. The panel 210 includes a first subpanel 212a, a second subpanel 212b, and a third subpanel 112c. The first subpanel 212a is separated from the second subpanel 212b across the first fold 214a. The third subpanel 212c is positioned adjacent the second subpanel 212b and opposite the first subpanel 212a. The third subpanel 212c in the illustrated embodiment is positioned opposite the second subpanel 212b and across the second fold 214b.

The flexible drive shaft 220 has a first end 222 opposite a second end 224 and includes a plurality of segments between the first end 222 and the second end 224. As shown in FIG. 14, the plurality of segments includes a first segment 236, a second segment 238, and a third segment 240. The first segment 236 extends from the first end 222 to a fixed bend 226. The second segment 238 extends from the first bend 226 to an opening in the third subpanel 212c. One or more tabs 248 may couple the flexible drive shaft 220 to the panel 210. For example, the illustrated embodiment includes two tabs 248 that couple the second segment 238 of the flexible drive shaft 220 to the second subpanel 212b. The third segment 240 extends from the opening to the second end 224. The third segment 240 may comprise the flipping portion 230. The flipping portion 230 is configured to move between a first position and a second position as the greeting card 201 moves from a folded position (shown in FIG. 12) to an unfolded position (shown in FIG. 13).

The flexible drive shaft 220 may be coupled to the panel 210 in a number of different ways. For example, in the illustrated embodiment, the first segment 236 is coupled to the first subpanel 212a by a retaining panel 232 having a pair of retaining panel openings 234. The first segment 236 is threaded through the retaining panel openings 234 to hold the first segment 236 in position against the first subpanel 212a. The retaining panel 232 is coupled to the first subpanel 212a. In an alternate embodiment, the retaining panel 232 may take the form of tape that covers the first segment 236 and holds it to the first subpanel 212a.

The panel 210 has a first side 244 and a second side 246. Only the first side 244 may be viewed when the greeting card 201 is in the folded position (FIG. 12). However, both the first side 244 and the second side 246 may be viewed when the greeting card is in the unfolded position (shown in FIG. 13). In this embodiment, the flexible drive shaft 220 may not be completely obscured from view when the greeting card 201 is in the unfolded position. In other embodiments, a cover panel (not shown) may be added to hide the flexible drive shaft 220.

Referring now to FIGS. 15-18, another embodiment of a greeting card 301 incorporating a flexible driveshaft of the present invention is depicted. The greeting card 301 includes a panel 310, a first flexible drive shaft 308, a second flexible drive shaft 320, and one or more decorative portions 316 coupled to a flipping portion of the first flexible drive shaft 308 and a flipping portion of the second flexible drive shaft 320.

The panel 310 includes multiple subpanels as described above. The panel 310 includes a first subpanel 312a, a second subpanel 312b, and a third subpanel 312c, as illustrated in FIG. 16. The first subpanel 312a is separated from the second subpanel 312b by a first fold 314a. The second subpanel 312b and the third subpanel 312c are separated by a second fold 314b. The first flexible drive shaft 308 and the second flexible drive shaft 320 are positioned such that the portions of each flexible drive shaft on the second subpanel 312b side of the first fold 314a are between the second panel 312b and the third subpanel 312c. In other words, the third subpanel 312c is folded over the second subpanel 312b along the second fold 314b to conceal portions of the first flexible drive shaft 308 and portions of the second flexible driveshaft 320 there-between.

The first flexible drive shaft 308 may be constructed as substantially described above in reference to the flexible drive shaft 220 and include a flipping portion 309 coupled to the decorative portion 316. The second flexible driveshaft 320 includes a first end 322 opposite a second end 324. Both the first end 322 and the second end 324 of the second flexible drive shaft 320 are positioned on the second panel 312*b* side of the first fold 314*a*. In such aspect, the second flexible drive shaft 320 may also include an intermediate arm 323 (FIG. 18), which may be positioned on the first subpanel 312*a* side of the first fold 314*a*, as described in more detail below.

The second flexible drive shaft 320 has a plurality of segments extending between the first end 322 and the second end 324. The plurality of segments include a first segment 326, a second segment 330, a third segment 334, a fourth segment 340, a fifth segment 344, a sixth segment 346, and a seventh segment 350. The first segment 326 extends between the first end 322 and a slot opening 328*a*. The second segment 330 extends through the slot opening 328*a* to a first apex 332 and returns through the slot opening 328*a*. The second segment 330 forms a first flipping portion. The third segment 330 extends from the slot opening 328*a* to a first fixed bend 336. The fourth segment 340 extends from the first fixed bend 336 to a second fixed bend 338 and forms the intermediate arm 323. The first fixed bend 336 and the second fixed bend 338 are positioned adjacent the first fold 314*a*. The fourth segment 340 extends on the first subpanel 312*a* side of the first fold 314*a* while the remaining plurality of segments extend on the second subpanel 312*b* side of the first fold 314*a*. The fourth segment 340 is coupled to the first subpanel 312*a* at a coupling 342. The coupling 342 may comprise tape (as shown in FIG. 18). In some embodiments, the fourth segment 340 may be twisted such is that the first fixed bend 336 and the second fixed bend 338 may be positioned adjacent to one another.

The fifth segment 344 extends from the second fixed bend 338 to a second slot opening 328*b*. A tab formed in the second subpanel 312*b* (as illustrated in FIG. 17) may be used to partially retain the fifth segment 344 in position. The sixth segment 346 extends through the second slot opening 328*b* to a second apex 348 and return from the second apex 348 back through the second slot opening 328*b*. The sixth segment 346 forms a second flipping portion. The seventh segment 350 extends from the second slot opening 328*b* to the second end 324.

In some aspects, the first segment 326 and the seventh segment 350 may be substantially similar. In other aspects, the second segment 330 and the sixth segment 346 may be substantially similar. In still other aspects, the third segment 334 and the fifth segment 344 may be substantially similar. In some aspects, the second flexible driveshaft 320 may not have the first segment 326 or the seventh segment 350 and the first end 322 and the second end 324 may not return through the slot opening 328*a* and 328*b*, respectively.

Figure 15:
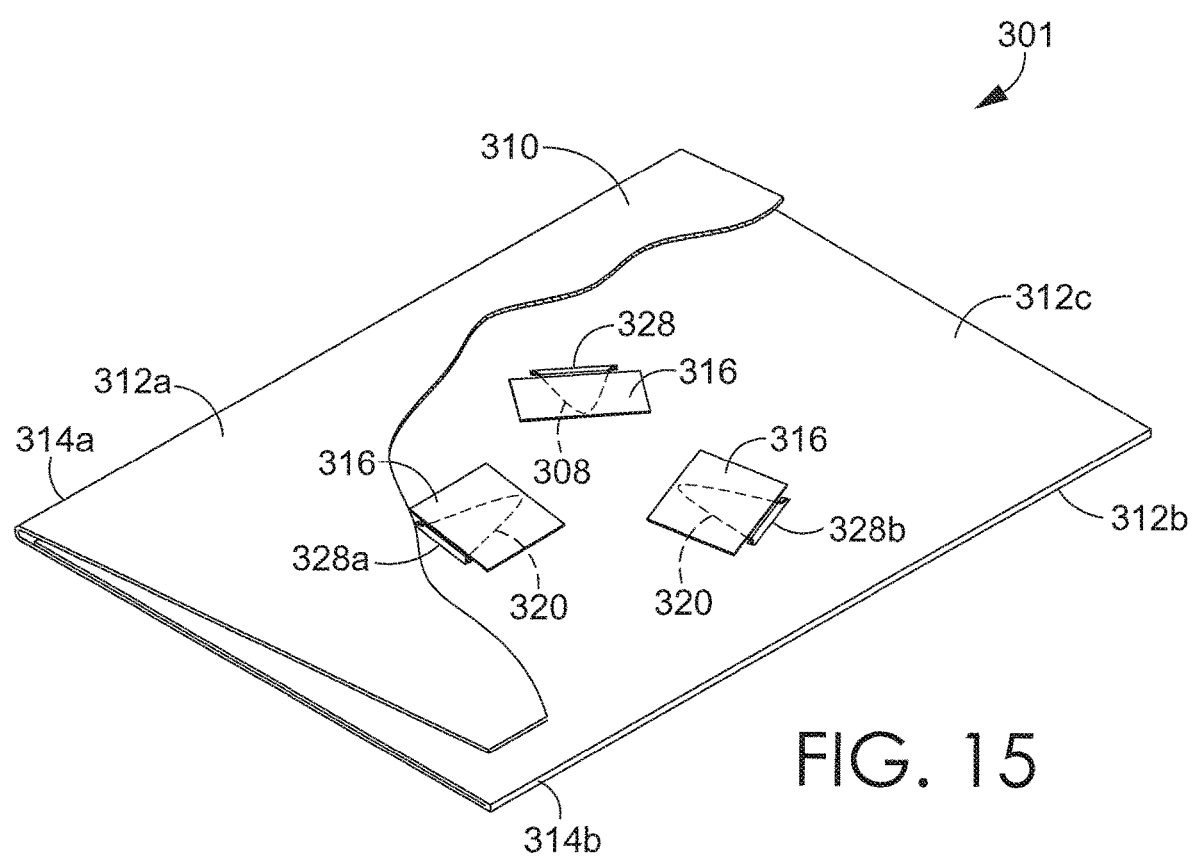

The decorative portion 316 of the greeting card 301 may comprise individual moving portions, as illustrated in FIG. 15 and FIG. 16, or may comprise one unitary element similar to the decorative portion 16 shown in FIG. 3. The decorative portion 316 may be coupled to the first flexible drive shaft 308, the second flexible drive shaft 320, or the third subpanel 312*c*. In some embodiments, the decorative portion 316 may be coupled to each of the first flexible drive shaft 308, the second flexible drive shaft 320, and the third subpanel 312*c*. The decorative portion 316 may also be coupled to any combination thereof. The decorative portion 316 may be configured to move in response to the flipping portion 309 of the first flexible drive shaft 308 and the first flipping portion and the second flipping portion (such as the second segment 330 and sixth segment 346) of the second flexible drive shaft 320 moving between a first position associated with the greeting card 301 being folded, as illustrated in FIG. 15, and a second position associated with the greeting card being unfolded as illustrated in FIG. 16.

For example, the second segment 330 and the sixth segment 346 of the second flexible drive shaft 320 may be configured to move between the first position and the second position in response to the greeting card 301 being opened. When the greeting card 301 is opened, a bending moment arm is applied from the fourth segment 340 of the second flexible drive shaft 320 about the first fixed bend 336 and the second fixed bend 338. The moment arm applied from the fourth segment 340 of the second flexible drive shaft 320 increases as the greeting card is further opened. Once the moment arm increases to a point that it overcomes the frictional forces holding the first, second, and third segments and the fifth, sixth, and seventh segments in position, the second flexible drive shaft straightens out and/or rotates/twists. The straightening out and/or rotating/twisting of the free ends of the second flexible drive shaft results in the second segment 330 and the sixth segment 346 moving from their first position, as illustrated in FIG. 15, to their second position, as illustrated in FIG. 16.

Figure 19:
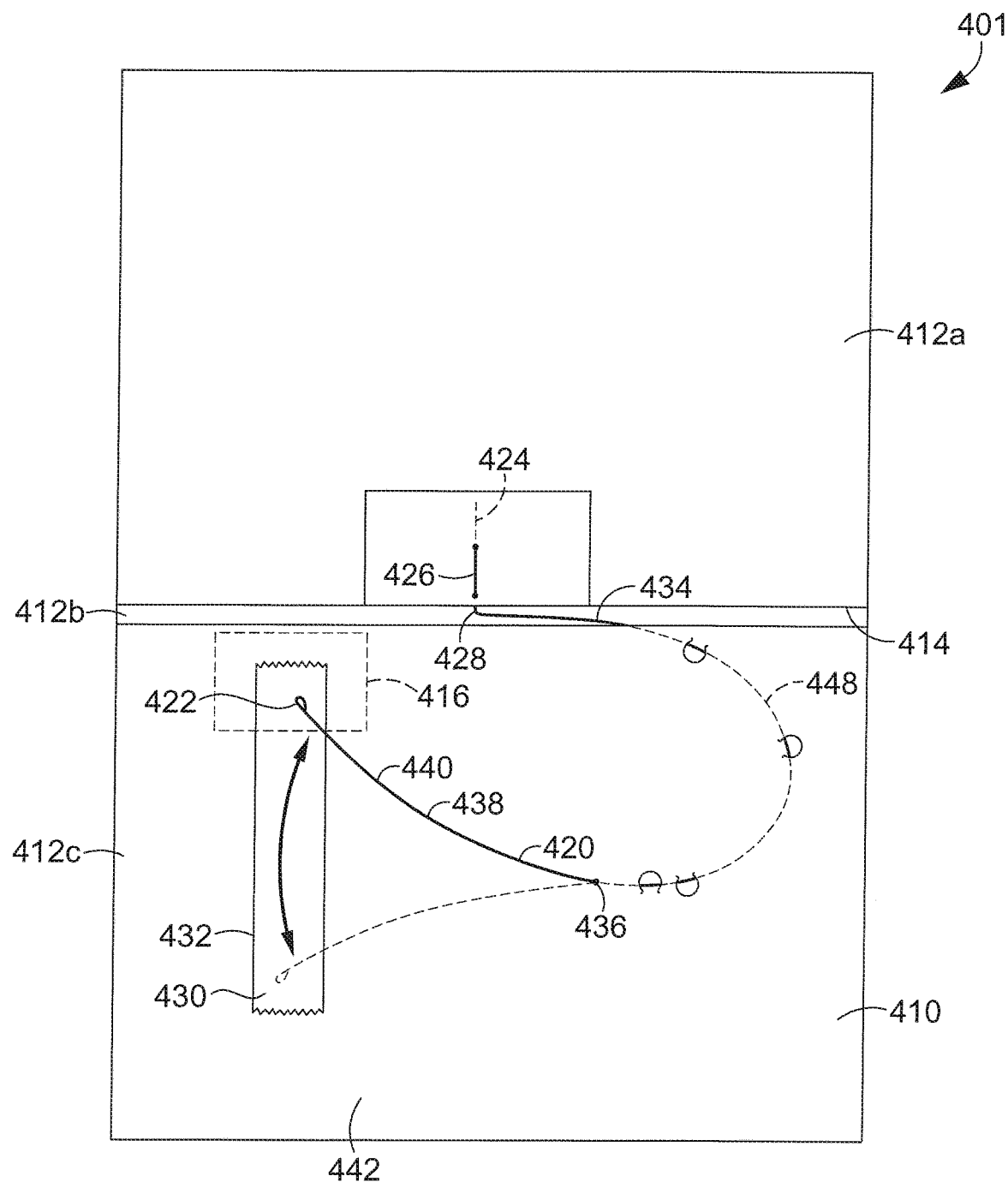
FIG. 19 is a front perspective view of a greeting card in an open position in accordance with a fifth embodiment of the present invention.

In a variation of the flexible driveshaft of the present invention, which is made (in some embodiments) by having a permanent bend across a fold and just a flex of the flexible driveshaft (i.e., it is not permanently bent into a curve and would straighten if not held in a curved orientation by, for example, the tabs), a flexible slide shaft may be created by putting a permanent curve in the portion of the flexible shaft that is the motion side of the arm. For example, as illustrated in FIG. 19, a greeting card 401 may include a panel 410 having a fold 414 separating a first subpanel 412*a* from a second subpanel 412*b*, a flexible slide shaft 420 coupled to the panel 410, and a driven element 416 coupled to a portion of the flexible slide shaft 420. In some aspects, the greeting card may also include one or more tabs 448 that may couple the flexible slide shaft 420 to the panel 410. In other aspects, the greeting card 401 may include a low-friction surface 430 across which a sliding end 422 of the flexible slide shaft 420 may slide. The low-friction surface 430 may be integral to the greeting card 401 or may be coupled to the greeting card 401. For example, a low-friction tape 432 may be secured to the panel 401.

The flexible slide shaft 420 may have a first end 424 opposite the sliding end 422 and a plurality of segments extending between the first end 424 and the sliding end 422. For example, the plurality of segments may include a first segment 426 extending from the first end 424 to a fixed bend 428, a second segment 434 extending from the fixed bend 428 to an opening 436 in the panel 410, and a third segment 438 extending from the opening 436 to the sliding end 422.

Different from the flexible drive shaft discussed above, the flexible slide shaft 420 may contain an extended bend 440. The extended bend 440, for example, may fix a curve in the flexible slide shaft 420. Hence, the second segment 434 and the third segment 438 may be curved when the flexible slide shaft 420 is in an unflexed position (i.e., they are not straight at rest). The curve or extended bend 440 may be fixed in the flexible slide shaft 420 anywhere on the sliding end 422 side of the fixed bend 428. The extended bend 440 causes the sliding end 422 to slide along a surface 442 of the greeting card 401 in a generally smooth motion instead of simply rotating in place, as would happen with the flexible driveshaft described above upon the moment arm of the flexible driveshaft overcoming the frictional forces.

When the greeting card 401 is in the open or closed position, the extended bend 440 in the third segment 438 is in the rest position and the extended bend 440 curves along the surface 442, as illustrated. When the greeting card 401 is moved between the open and closed positions, the third segment 438 of the flexible slide shaft 420 is rotated causing the extended bend 440 to move between curving toward the fold 414 in the open position (as illustrated in solid lines) and curving away from the fold 414 in the closed position (as illustrated in dashed lines). In between the open and closed positions, the curve is in varying stages of facing down toward the surface 442, which causes the extended bend of the flexible slide shaft 420 to be straightened.

The flexible slide shaft 420 may be coupled to the panel 410 such that the first segment 426 is positioned on the first subpanel 412a side of the fold 414 and the second segment 434 and the third segment 438 are positioned on the second subpanel 412b side of the fold 414. The fixed bend 428 may be positioned adjacent the fold 414. Hence, when the greeting card 401 is in the folded position, the flexible slide shaft 420 may wrap around the panel 401 at the fold 414. Further, when the greeting card 401 is in the unfolded position, the flexible slide shaft 420 follows the panel 410. Accordingly, and similar to the flexible drive shaft discussed above, when the greeting card 401 is opened, the flexible slide shaft 420 harnesses the work of opening the greeting card 401 to move the sliding end 422 and the driven element 416. A moment arm is created at the first segment 426 about the fixed bend 428 when the greeting card 401 is opened, which in turn moves the sliding end 422 from a first position to a second position. In one embodiment, a gift card may be coupled to the sliding end 422 of the flexible slide shaft 420. When the greeting card 401 is opened, the flexible slide shaft 420 moves the gift card from near the fold 414 out away from the fold 414 in a sliding manner to "present" the gift card to the recipient.

Many variations can be made to the illustrated embodiments of the present invention without departing from the scope of the present invention. Such modifications are within the scope of the present invention. For example, in the illustrated embodiments the flexible driveshaft is made of a spring steel music wire. Other material may be used for driveshaft or slide shaft. Additionally, various thicknesses of the driveshaft may be found beneficial for different motions. In some embodiments a spring steel music wire of 0.024" outside diameter may work best while a thicker or thinner wire or other material might work better in other embodiments. Similarly, while bends of certain diameters and angles have been illustrated, other bend angles and diameters may be used to achieve different movements of the flexible driveshaft and the flexible slide shaft.

From the foregoing it will be seen that this invention is one well adapted to attain all ends and objects hereinabove set forth together with the other advantages which are clear following the complete disclosure above and which are inherent to the methods and apparatuses described herein. It will be understood that certain features and sub combinations are of utility and may be employed without reference to other features and sub combinations. This is contemplated by and is within the scope of the invention and claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

The invention claimed is:

1. An article having mechanically actuated moving portions, the article comprising:

a panel having at least a first subpanel and a second subpanel, the first subpanel and the second subpanel being separated by a fold in the panel;

a flexible drive shaft having a first end, a second end, and a flipping portion between the first end and the second end, the flexible drive shaft being coupled to the panel such that the first end is positioned on the first subpanel side of the fold and the second end is positioned on the second subpanel side of the fold;

the flipping portion of the flexible drive shaft is configured to move from a first position to a second position when the first and second subpanels are moved away from each other; and a decorative portion coupled to the second subpanel, wherein the decorative portion is in a folded configuration when the panel is folded, wherein the decorative portion is in an unfolded configuration when the panel is unfolded, wherein the decorative portion moves from the folded configuration to the unfolded configuration in response to the flipping portion moving from the first position to the second position.

2. The article of claim 1, further comprising the panel having a third subpanel and a fourth subpanel, the third subpanel being adjacent the second subpanel and being separated from the second subpanel by a second fold, the fourth subpanel being adjacent the third subpanel and being separated from the third subpanel by a third fold.

3. The article of claim 2, wherein the second fold is positioned in the center of the panel and wherein the one or more flexible drive shafts are made of spring steel wire.

4. The article of claim 3, wherein each of the first subpanel, the second subpanel, the third subpanel, and the fourth subpanel have generally equal dimensions.

5. The article of claim 1, further comprising the panel having a window opening in one or more of the first subpanel and the second subpanel.

6. The article of claim 1, further comprising one or more openings formed in the second subpanel and the flexible drive shaft extending through at least one of the one or more openings in the second subpanel.

7. The article of claim 1, further comprising:
the panel having a first surface and a second surface, wherein the first end and the second end of the flexible drive shaft are positioned adjacent the first surface and the flipping portion is positioned adjacent the second surface.

8. The article of claim 1, further comprising:
the panel having one or more flexible drive shaft securing tabs.

9. The article of claim 1, further comprising:
a flexible drive shaft retaining panel, the flexible drive shaft retaining panel being affixed to the first subpanel and configured to couple a portion of the flexible drive shaft to the first subpanel.

10. The article of claim 9, wherein the flexible drive shaft retaining panel includes at least two openings through which the flexible drive shaft is threaded.

11. The article of claim 1, wherein the decorative portion is affixed to the flipping portion and the second subpanel.

12. A foldable article comprising:
a panel folded across a fold line to define a first subpanel and a second subpanel; and
a flexible wire having first, second, and third segments, wherein the first segment is fixed at a first angle to the second segment, wherein the third segment is fixed at a second angle to the second segment and the third segment is opposite the first segment, wherein the first segment is positioned on the first subpanel side of the fold line, and wherein the second segment and the third segment are positioned on the second subpanel side of the fold line.

13. The article of claim 12, wherein the first angle is larger than the second angle.

14. The article of claim 12, wherein the second segment is coupled to the second subpanel in a flexed state such that the second segment extends from the first segment to the third segment in an arcuate shape.

15. The article of claim 14, wherein the arcuate shape approaches the fold line in a tangential manner.

16. A foldable article comprising:
 a panel folded across a fold line to define a first subpanel and a second subpanel;
 a drive shaft comprised of a flexible material, the drive shaft having a first segment fixed at an angle to a second segment and a driven portion fixed at an angle to the second segment opposite the first segment, the first segment coupled to the first subpanel, at least one of the second segment and the driven portion coupled to the second subpanel,
 wherein the drive shaft transfers mechanical motion from the first segment to the driven portion in response to relative movement between the first subpanel and the second subpanel.

17. The foldable article of claim 16, further comprising:
 a retaining panel coupled to the first subpanel, the retaining panel having a first opening and a second opening, wherein the first segment is threaded through the first opening and the second opening.

18. The foldable article of claim 16, wherein the first segment is fixed perpendicular to the second segment.

19. The foldable article of claim 16, further comprising:
 at least one tab formed in the second subpanel and configured to couple the second segment to the second subpanel in a flexed position.

20. The foldable article of claim 16, further comprising:
 a decorative portion coupled to the driven portion of the drive shaft.

* * * * *